US012157606B2

(12) United States Patent
Alexander et al.

(10) Patent No.: US 12,157,606 B2
(45) Date of Patent: Dec. 3, 2024

(54) RE-CONFIGURABLE AND RE-SIZABLE MODULAR STORAGE CONTAINER SYSTEM

(71) Applicant: Vaikin Kansepts Inc., Schenectady, NY (US)

(72) Inventors: Kristofer M. Alexander, Schenectady, NY (US); Kyle S. Harrington, Waterford, NY (US)

(73) Assignee: Vaikin Kansepts Inc., Schenectady, NY (US)

( * ) Notice: Subject to any disclaimer, the term of this patent is extended or adjusted under 35 U.S.C. 154(b) by 0 days.

(21) Appl. No.: 18/623,206

(22) Filed: Apr. 1, 2024

(65) Prior Publication Data

US 2024/0327067 A1 Oct. 3, 2024

Related U.S. Application Data

(60) Provisional application No. 63/493,783, filed on Apr. 3, 2023.

(51) Int. Cl.
*B65D 21/08* (2006.01)
*B25H 3/02* (2006.01)
(Continued)

(52) U.S. Cl.
CPC ........... *B65D 21/083* (2013.01); *B25H 3/023* (2013.01); *B65D 21/0234* (2013.01);
(Continued)

(58) Field of Classification Search
CPC . B25H 3/02; B25H 3/023; B25H 3/00; B25H 3/026; B65D 21/0234;
(Continued)

(56) References Cited

U.S. PATENT DOCUMENTS 303,783 A * 8/1884 Zimmerman ........ A47B 81/067 190/30
722,771 A * 3/1903 Taylor .................. B65D 5/5266 206/743
(Continued)

FOREIGN PATENT DOCUMENTS

JP 3067707 U 9/2004
KR 200159269 Y1 * 10/1999
(Continued)

OTHER PUBLICATIONS

PCT/US2024/022792, Notification of International Search Report and Written Opinion, Aug. 2, 2024.

*Primary Examiner* — Mollie Impink
(74) *Attorney, Agent, or Firm* — David H. Judson

(57) ABSTRACT

A container storage system comprises structural members with particular hole patterns. In particular, a series of holes placed on an exterior face of a “core” module horizontally along its centerline relative to its height (core module height/2) are also placed on any additional module the same distance (core module height/2) from its mating face (to the core module) to facilitate connection with hinges and connectors by the use of inserting removable hardware through the holes. This structural arrangement allows for a combination of modules to be disassembled and reconfigured as a user’s storage needs and/or conditions change over time. The modular storage system is scalable to any size and may be made from any material strong enough to support its own weight and the weight of its contents.

15 Claims, 16 Drawing Sheets

(51) Int. Cl.
*B65D 21/02* (2006.01)
*B65D 25/28* (2006.01)

(52) U.S. Cl.
CPC .............. *B65D 21/08* (2013.01); *B65D 25/28* (2013.01); *B65D 2525/285* (2013.01)

(58) Field of Classification Search
CPC .. B65D 21/083; B65D 77/006; B65D 81/263; B65D 85/305
USPC ............... 312/269, 325, 217, 130, 201, 902; 190/17; 206/372, 373, 503, 743, 747; 220/4.22, 4.24, 4.26
See application file for complete search history.

(56) References Cited

U.S. PATENT DOCUMENTS

| | | | | | |
|---|---|---|---|---|---|
| 810,026 | A * | 1/1906 | Biggs | G09F 5/02 | 190/17 |
| 903,078 | A * | 11/1908 | Gianini | B65D 5/5253 | 229/120.09 |
| 1,089,349 | A * | 3/1914 | Labadie | A47B 53/02 | 312/201 |
| 1,284,322 | A * | 11/1918 | Hammond | B65D 11/00 | 190/34 |
| 1,366,243 | A * | 1/1921 | Carr | B25H 3/023 | 190/17 |
| 1,956,227 | A * | 4/1934 | Plummer | G09F 5/02 | 190/34 |
| 1,992,435 | A * | 2/1935 | Labadie | B25H 3/023 | 220/765 |
| 2,135,401 | A * | 11/1938 | Kiff | B65D 21/0224 | 206/503 |
| 2,491,374 | A * | 12/1949 | Gold | B25H 3/023 | 211/130.1 |
| 3,407,961 | A * | 10/1968 | Box | B65D 85/50 | D30/114 |
| 3,710,761 | A * | 1/1973 | Gregory | A01K 1/0245 | 220/4.24 |
| 4,245,422 | A * | 1/1981 | Souza | A01K 97/06 | 206/315.11 |
| 4,782,619 | A | 11/1988 | Richards | | |
| 6,003,708 | A * | 12/1999 | Meyering | B65D 1/30 | 220/520 |
| 6,520,610 | B1 * | 2/2003 | Miller | A47B 88/70 | 312/277 |
| 8,919,896 | B1 * | 12/2014 | Shewchuck | B25H 3/021 | 280/47.35 |
| 9,089,965 | B1 | 7/2015 | Cheng | | |
| 10,435,042 | B1 * | 10/2019 | Weymouth | B65D 88/12 | |
| 11,116,297 | B1 | 9/2021 | Latham et al. | | |
| D1,014,968 | S | 2/2024 | Lam et al. | | |
| 11,931,881 | B1 | 3/2024 | O'Brien | | |
| 2004/0168941 | A1 * | 9/2004 | Cho | B25H 3/023 | 206/349 |
| 2004/0169447 | A1 | 9/2004 | Bezzubov | | |
| 2004/0188434 | A1 * | 9/2004 | Bellotti | D06B 23/04 | 220/4.27 |
| 2005/0211576 | A1 * | 9/2005 | Paquette | B62B 5/06 | 206/139 |
| 2012/0024739 | A1 * | 2/2012 | Fjelland | F16B 45/02 | 403/321 |
| 2013/0307214 | A1 | 11/2013 | Groller et al. | | |
| 2018/0200875 | A1 | 7/2018 | Wolle et al. | | |
| 2021/0147113 | A1 | 5/2021 | Workman | | |
| 2022/0257012 | A1 | 8/2022 | Short | | |

FOREIGN PATENT DOCUMENTS

| | | | |
|---|---|---|---|
| KR | 200439840 | Y1 | 5/2008 |
| KR | 200440197 | Y1 | 5/2008 |

* cited by examiner

RE-CONFIGURABLE AND RE-SIZABLE MODULAR STORAGE CONTAINER SYSTEM

BACKGROUND OF THE INVENTION

Today, typical storage containers such as toolboxes, tackle boxes, or sewing boxes come in fixed sizes and offer limited modularity in terms of choosing and connecting different combinations of tiers. As an example, existing stackable tools boxes do allow for adding modules on top of each other or next to each other, but typically these solutions only allow the drawers and swing tiers to open in one pre-determined direction, which is not selectable by the user. In addition, such containers cannot easily be used while stacked, and they require being unstacked to access certain tiers. This also increases the footprint of space used from one stack to multiple smaller stacks.

SUMMARY OF THE INVENTION

A tiered modular storage container system allows for a large number of re-configurable combinations of one or more drawer modules and/or one or more swing tray modules (collectively, storage modules) which can be scaled to any size for storage of items such as game pieces, craft supplies, or mechanical tools. The user can select the order to stack different storage modules, the direction that the swing trays swing and/or the drawers in the drawer modules open, and re-configure them in a large variety of configurations.

As will be described below, the advantages of the modular storage system herein are achieved by providing structural members with particular hole patterns configured to receive fastening elements (e.g., hinges and connectors).

In one embodiment, the storage system comprises at least a first (or core) module, and a second module, wherein each of the modules comprises a plurality of side structural members each of which has a height and a length. At least one side structural member of the first module includes a series of holes positioned horizontally along an axis extending along the length, wherein the axis is located a given distance from a first edge along the length of the structural member of the first module. At least one side structural member of the second module also includes the series of holes positioned horizontally along its axis extending along the length. The axis of the structural member of the second module is also located the given distance from a first edge along the length of the structural member. When the first and second modules have the same height, the given distance is one-half that height. The system also includes one or more hinge arms, together with removable hardware configured to couple the second module to the first module via the one or more hinge arms. Using the hinge arms, the second module is movable relative to the first module from a first position overlaying the first module to a second position offset from the first module In a preferred embodiment, a series of holes placed on an exterior face of a "core" module (tray or drawer) horizontally along its centerline relative to its height (core module height/2) are also placed on any additional module the same distance (core module height/2) from its mating face (to the core module) to facilitate connection with hinges and connectors by the use of inserting removable hardware through the holes. This structural arrangement allows for a combination of modules to be disassembled and reconfigured as the user's storage needs and/or conditions change over time. The modular storage system is scalable to any size and may be made from any material strong enough to support its own weight and the weight of its contents.

For a more complete understanding of the subject matter and the advantages thereof, reference is now made to the following descriptions taken in conjunction with the accompanying drawings, in which:

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION OF THE INVENTION

The term "module" as used herein should be construed broadly to include a physical component of the container system with surfaces that define an interior storage space. In a typical implementation, various modules can be (or are) combined, in accordance with the description contained herein, to form an overall container system. In this system, there is at least one module that acts as a base or "core," and one or more additional modules. As noted above, the particular advantages of the system herein are realized using structural members that include particular hole patterns that support hinges and connectors to facilitate positioning of the modules relative to one another. The resulting module combinations can be disassembled and reconfigured as the user's storage needs and/or conditions change over time, and the modular storage system is scalable to any size.

As will be seen, side surfaces of each module are configured to define holes (more generally, hole patterns) that can accommodate fasteners (e.g., a Chicago screw/screw post) that can fit through those holes. The specific arrangement of holes in the side surfaces of the various modules enable a user to easily configure a collection of modules in any number of a variety of different ways that include stacked and/or side-by-side configurations, with swing trays and/or drawers that open in various directions, and/or various numbers, types, and/or heights of tiers. This enables a user (e.g., a person who purchases a container system as a kit that contains a variety of individual pieces) to assemble and/or subsequently reconfigured a storage container with the pieces of the kit, in any number of different ways—to accommodate different desired uses for the storage container and/or uses that evolve or change over time.

In a typical implementation, the pattern of holes on the sides of each drawer module base and swing tray module allows for the interchangeable nature of configuring a large number of combinations of modules on top of each other, adjacent to each, and/or at different directional offsets (0, 90, 180, 270 degrees) allowing the user to choose the direction each module will open. The design also allows the user to reconfigure the entire unit as needed to accommodate new functional applications as many times as necessary. Additionally, this solution also allows all modules to be used while stacked in the same footprint and does not require unstacking to access any modules, which keeps the necessary space to access the storage consistent and at a minimum.

Figure 1A:
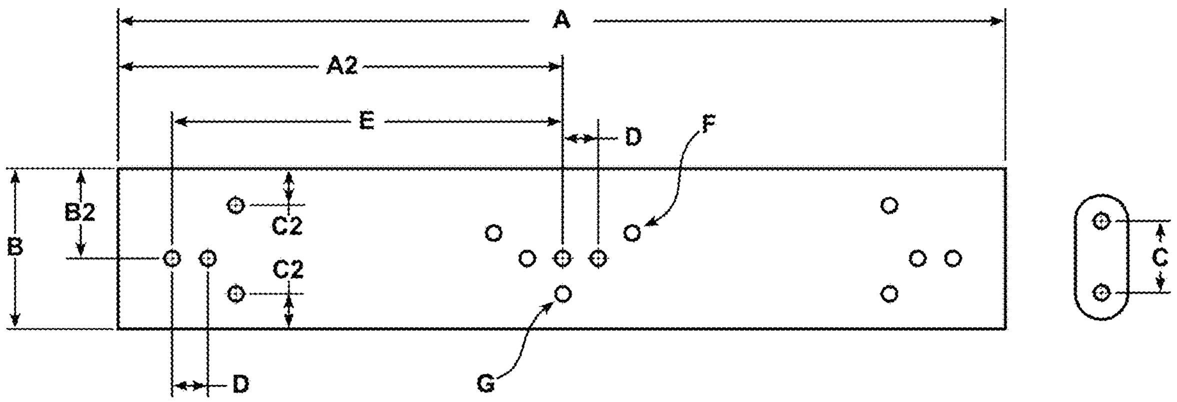
FIG. 1*a* depicts an example hole pattern for a side panel (e.g., of a drawer module), together with a connector for the side panel.

Referring now to the drawing, FIG. 1*a* shows an example of a first side panel 100 (e.g., of a drawer module), together with a connector 102. For purposes of illustration, it is assumed that this side panel is one of the four (4) sides of a core module for the system. The first side panel has a hole pattern 104. The side panel has a first dimension (here corresponding to length) A, and a second dimension (here corresponding to height) B. As depicted, the position of the holes in the horizontal plane are equilaterally centered between the outer edges of dimension (A). The position of the hole pattern on the vertical centerline of dimension (B) and holes (F) and (G) are based, at least in part, on a desired core swing tray height, namely, dimension (B), where the center line (B2) is (B)/2. If a swing tray (not shown here, but referred to below as a "top swing tray") is then located above the core swing tray tier, its height must be less than (B) and greater than (B2)+ (2×hardware hole diameter), and its hole layout centerline will be (B2) above its bottom. Inversely, if a swing tray (not show here, but referred to below as a "bottom swing tray") is located below the core swing tray, its height must be greater than (B) and its hole layout centerline will be (B2) below the top.

Connectors, such as connector 102 in FIG. 1*a*, are used, for example, to join drawer modules (e.g., vertical) to each other as well as to join a drawer module to a base swing tray module. The exemplary connector 102 in FIG. 1*a* has a hole layout dimension of (C). In an exemplary implementation, drawer modules and swing trays modules have a set of holes for joining to each other where (C2) is (C)/2. Drawer modules have connector holes which are located (C2) above the bottom and (C2) below the top. Swing tray modules typically have a set of connector holes, which are located (C2) above the bottom only.

With reference back to FIG. 1*a*, the amount of swing tray module visibility/accessibility when open can be controlled by varying dimension (E). The greater the desired swing tray module visibility/accessibility, the larger (E) should be. That said, dimension (E) is not larger than (A2)−(2×material thickness), and opened swing tray module overlap is (A2−E)×2.

Hole (F) is used, for example, to install a hinge stop (see, element 600 in FIG. 6), which can be used to engage a hinge arm (element 602 in FIG. 6) and keep it from swinging to the fully open position. When engaged, this allows the user to have full access to the swing tray module below. Limiting the swing tray module from fully opening also gives the user the option of reducing the opened footprint (of the system) to a minimum while keeping the system's center of gravity closer to the center of the systems base. Hole (F) typically is located above the horizontal centerline and off the vertical centerline as desired.

Figure 8:
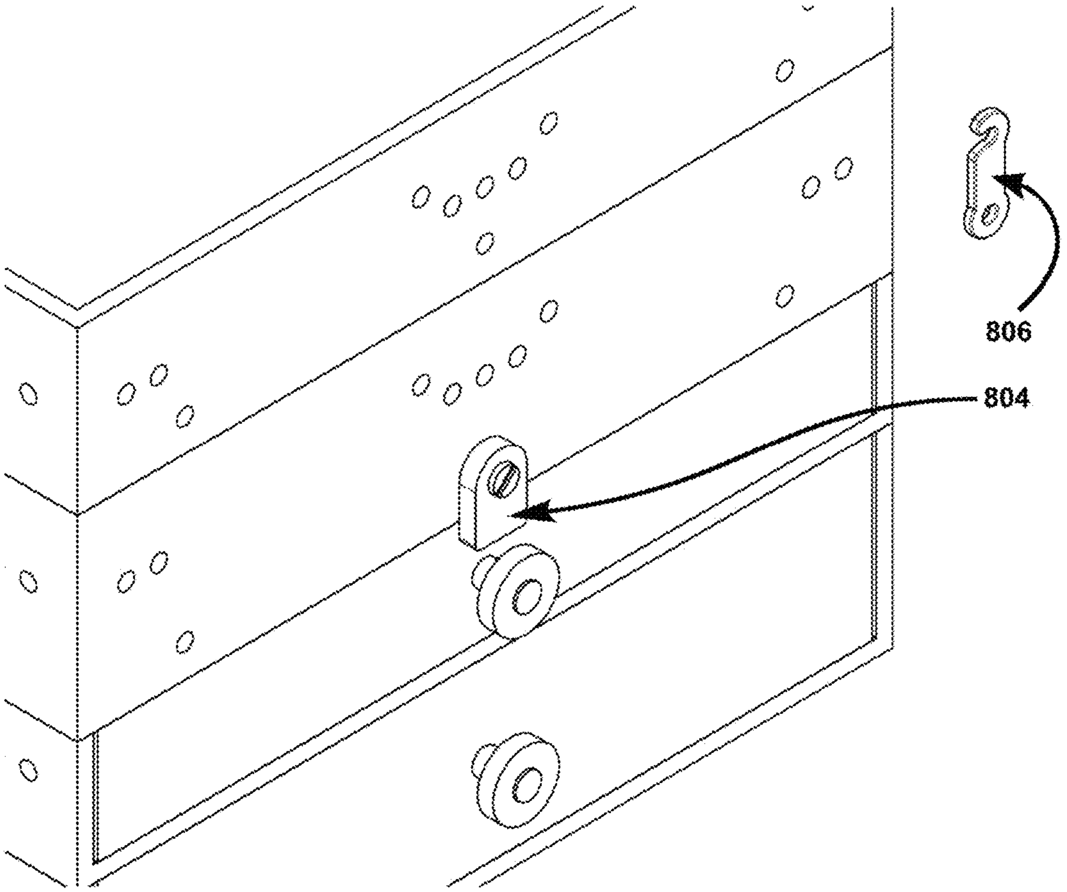
FIG. 8 depicts another storage system having modules with drawer catches and hinge latches that may be used as accessory hardware in the system.

Hole (G) is used, for example, to install accessory hardware such as, but not limited to, drawer catches and hinge latches. Drawer catches, such as catch 804 in FIG. 8, are used to secure drawers from opening. The hinge latches, such as latch 806 in FIG. 8, are used to secure two adjacent swing tray tiers from opening.

As depicted in FIG. 1*a*, the preferred hole pattern places holes at three different heights on the side surface-a lower height (C2), a middle height (along the centerline), and an upper height (C2). There are three holes at the lower height including one hole at approximately a center of the side surface, and two holes, one placed near either end of the side surface. There are seven holes at the middle height including one at approximately the center of the side surface, two near and on opposite sides of the center hole, and two holes at each of either end of the side surface. There are two holes at the upper height. These are centered around and equidistant from the center of the side surface. The specific dimensions of the lower height, middle height, and upper height above the lower edge of each side surface depends on the overall height of that side surface (see the following description concerning FIGS. 1*b*-1*f*). Generalizing, the hole pattern includes holes positioned horizontally along an axis extending along the length (the centerline), wherein the axis is located a given distance (in FIG. 1*a*, this is B2) from a first edge along the length of the structural member.

Figure 1B:
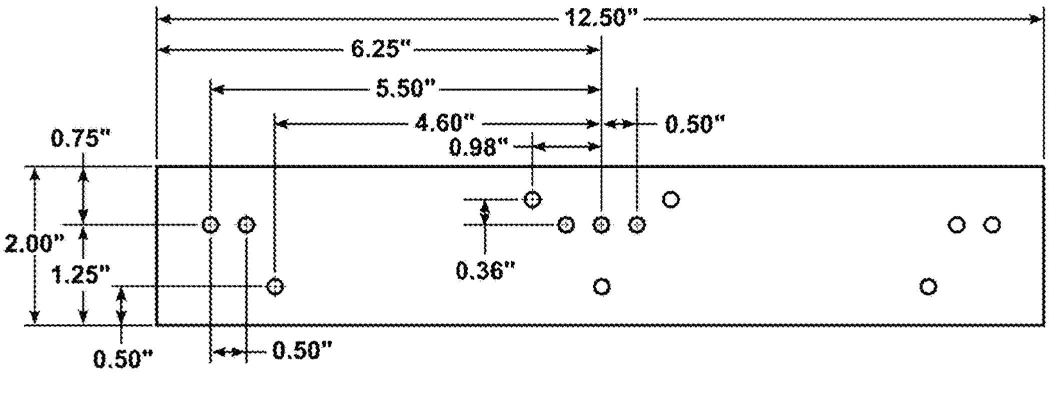
FIG. 1*b* depicts a second example of a side panel.
Figure 1C:
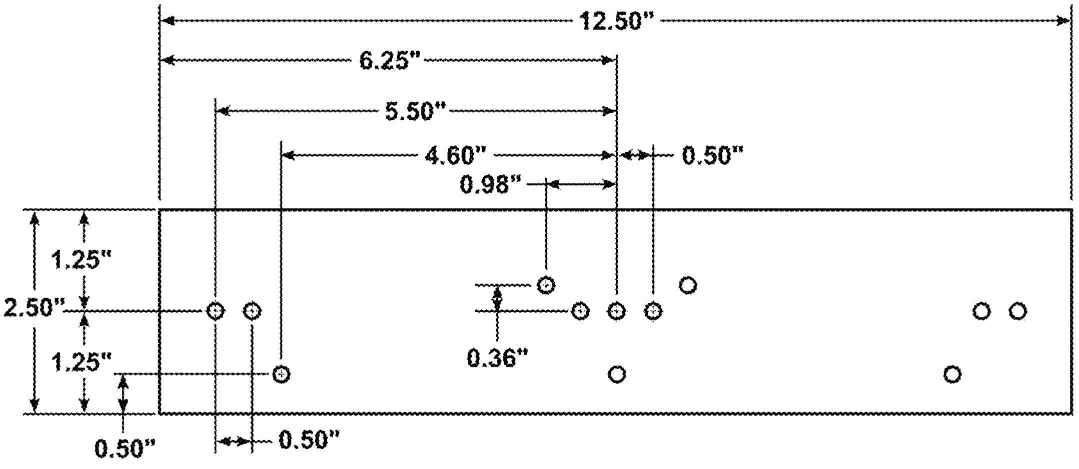
FIG. 1*c* depicts a third example of a side panel.
Figure 1D:
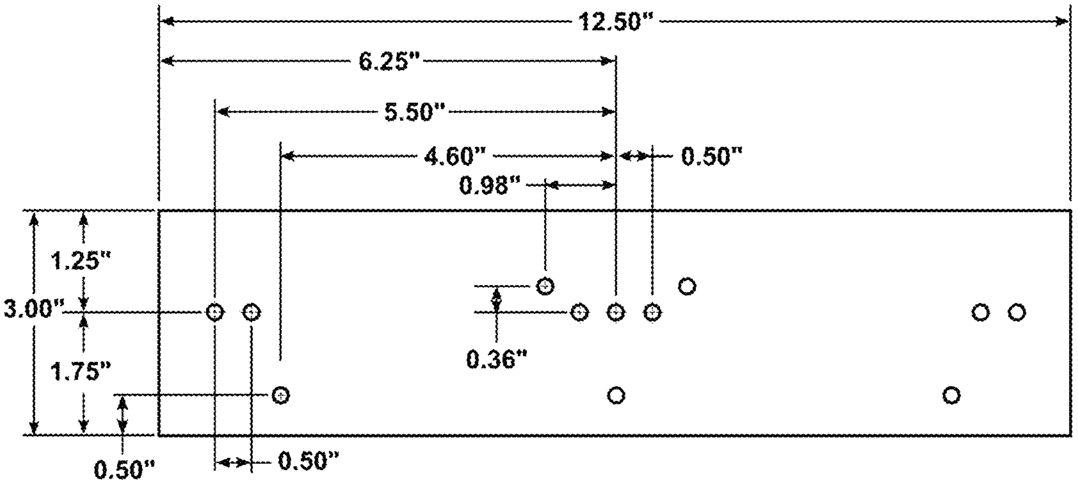
FIG. 1*d* depicts a fourth example of a side panel.
Figure 1E:
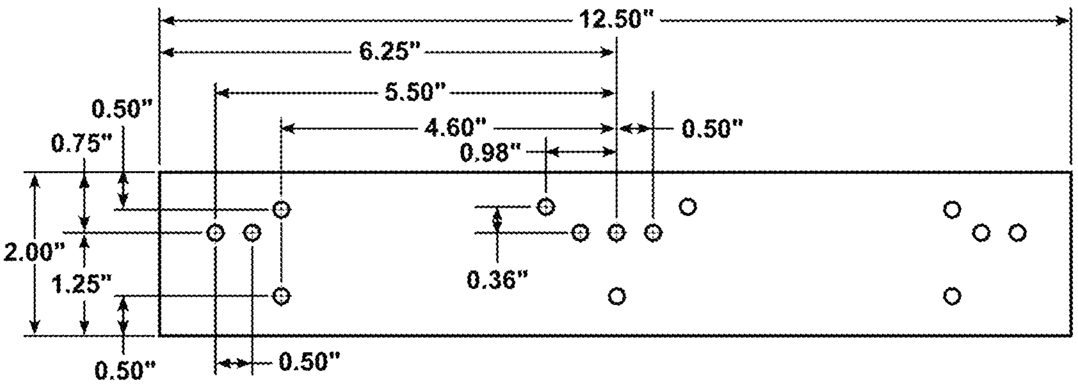
FIG. 1*e* depicts a fifth example of a side panel.
Figure 1F:
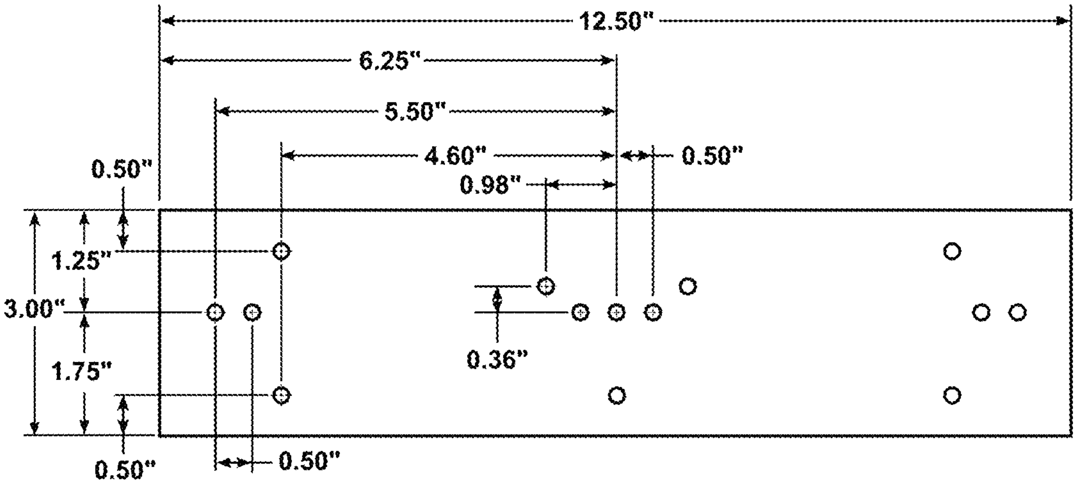
FIG. 1*f* depicts a sixth example of a side panel.

Typical container tier module heights for a system may vary based on implementation. Representative heights and side panel/hole patterns are depicted in FIG. 1*b* through 1*f*. In particular, FIGS. 1*b*, 1*c* and 1*d* are swing tray modules with heights of 2" (top swing tray), 2.5' (core swing tray) and 3.0" (bottom swing tray), and FIGS. 1*e* and 1*f* are drawer modules with heights of 2" and 3" (drawer base). Due to the hole patterns, the three swing tray module heights can be stacked interchangeably on top of each other and swing 0, 90, 180, or 270 degrees offset from the tier below it (i.e., it can swing between a closed and open position in any direction orthogonal to a side edge of the rectangular module beneath it). Unlike traditional storage solutions, this allows for modularity based on the application. Several non-limiting examples of the many combinations (which can include multiple drawer modules below them) that are available from the system include (i) one bottom tray, one core tray, and one top tray; (ii) one bottom tray, three core trays, and one top tray; (iii) two core trays and one top tray; (iv) two core trays; (v) three core trays and one top tray; (vi) four core trays; (vii) one bottom tray and one core tray; (viii) one bottom tray and two core trays; and (ix) one bottom tray and one top tray.

As a skilled person will appreciate, the modules may have multiple offsets from each other to allow for a large number of configurations including, without limitation, (i) a swing tray module on a swing tray module (0, 90, 180, 270) 3-hole hinge arm, with the two swing tray modules opening in same direction; (ii) a swing tray module on a swing tray module (0, 90, 180, 270) 2-hole hinge arm, with the swing tray modules opening with 90 degree offset; (iii) a swing tray module on a drawer module; and (iv) a drawer module on a drawer module (0, 90, 180, 270 degree).

Figure 2A:
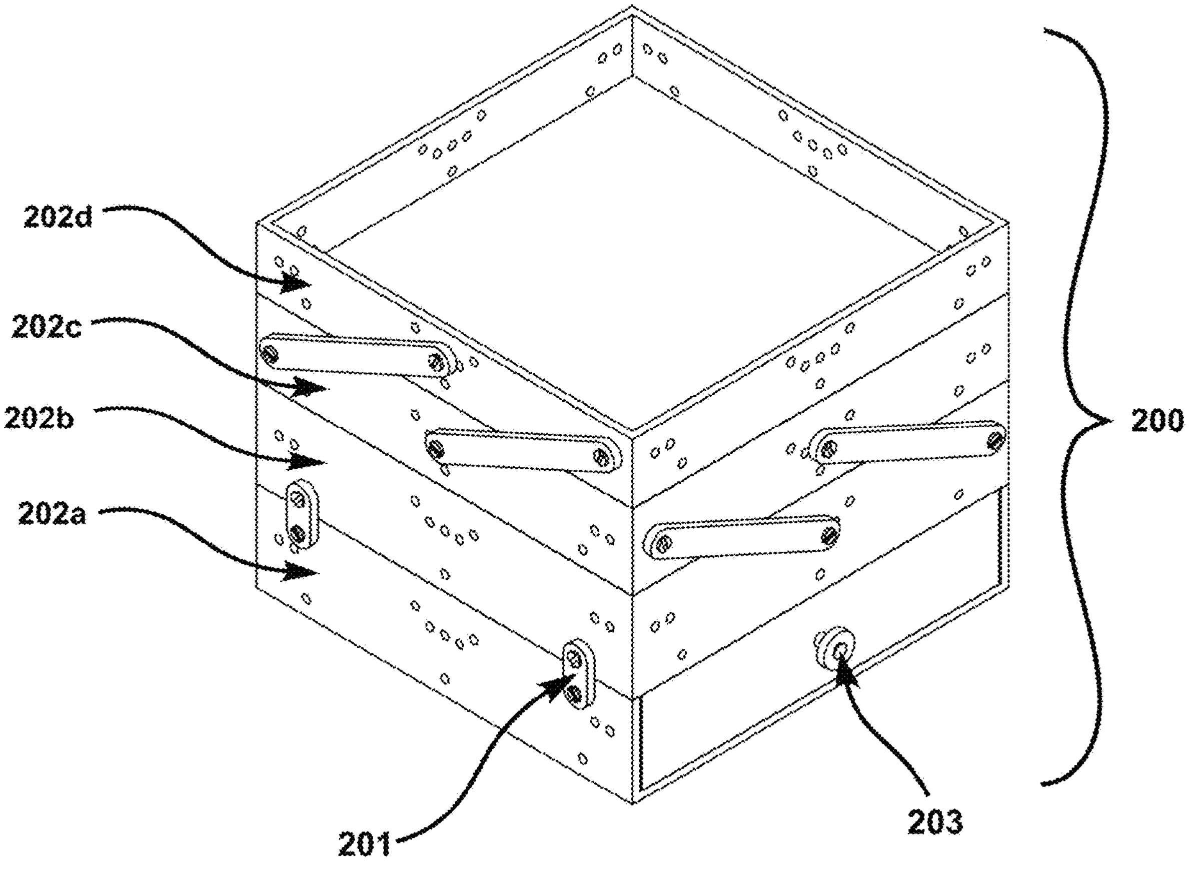
FIG. 2*a* depicts an example first storage system in a closed configuration and having an open top tier.
Figure 2B:
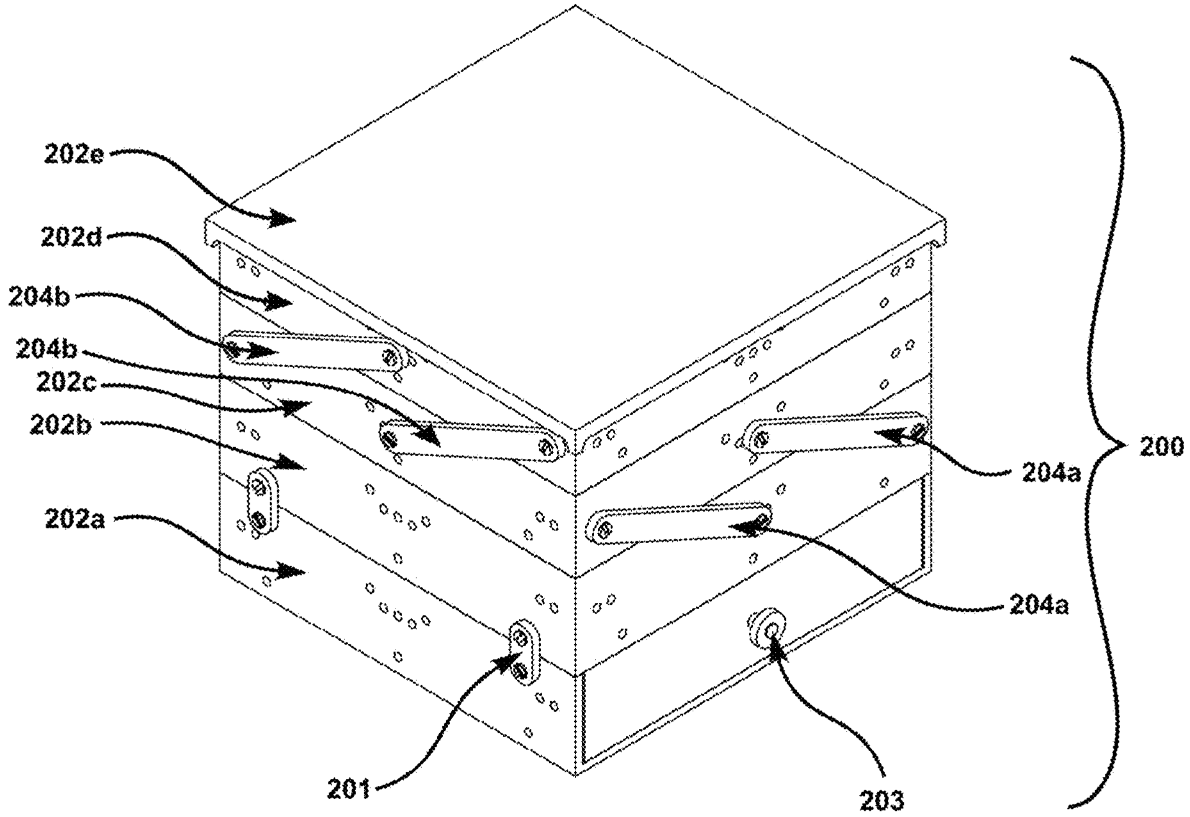
FIG. 2*b* depicts the first storage system in the closed configuration having a closed open top tier.
Figure 3:
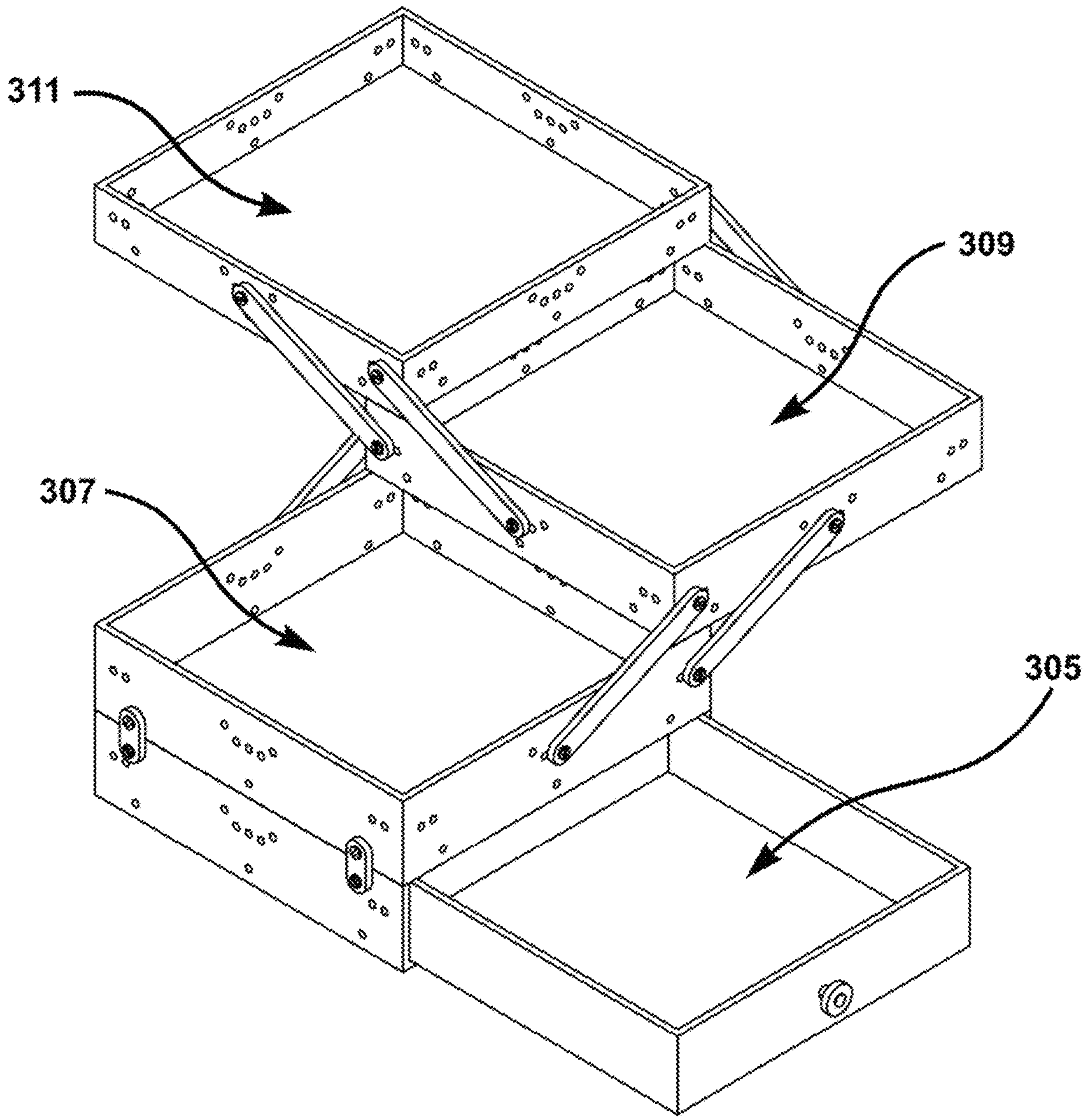
FIG. 3 depicts the first storage system in an open configuration.

FIGS. 2*a*-*b* and 3 show an exemplary implementation of a storage container system 200.

The illustrated storage container system 200 has four tiers 202*a*, 202*b*, 202*c*, and 202*d*. The first tier 202*a* is at the bottom of the container system 200. The second tier 202*b* is immediately above the first tier 202*a*. The third tier 202*c* is immediately above the second tier 202*b*. The fourth tier 202*d* is immediately above the fourth tier. Each tier 202*a*, 202*b*, 202*c*, 202*d* has a storage space configured to store one or more items (e.g., game pieces, etc.). Each tier in the illustrated implementation comprises a module—e.g., either a drawer module (at tier 202*a*) or a swing tray module (at tiers 202*b*, 202*c*, and 202*d*).

Drawer modules may be below swing tray modules in an assembled storage system (e.g., see 200 in FIG. 2*a*) and, in such cases, have their hole centerline located a distance of (B2) below the top of their sidewall (see FIG. 1*a* for example). Drawer modules can be configured with any height where there is adequate room for the hinge hole pattern and connectors do not interfere with each other.

FIGS. 2*a* and 2*b* show two views of the container system 200 in a closed configuration. In FIG. 2*a*, the top swing tray is uncovered; in FIG. 2*b*, the top swing tray 202*d* has a cover 202*e*. FIG. 2*a* also depicts the lowest tiers coupled by connectors 201, and the base (at tier 202*a*) includes a lock 203. FIG. 3 shows the container system 200 in an open configuration. In the closed configuration, as shown in FIGS. 2*a* and 2*b*, the tiers 202*a*, 202*b*, 202*c*, 202*d* are stacked directly above one another. In the closed configuration shown in FIG. 3, all of the storage spaces, except for the top tier's 202*d* storage space, are closed and not readily accessible by a human user. In the closed configuration, the tiers collectively define a uniform horizontal cross-section at every point along its height-—from the bottom of the container system 200 to the top of the container system 200. In the depicted embodiment, that cross-section is rectangular and, more specifically, in the illustrated implementation, square.

The first tier 202*a* is bottom tier 202*a* in the illustrated system 200 is a drawer tier, meaning it includes a drawer with an internal storage space for storing items therein. The drawer can slide, relative to a drawer housing, between a closed position (as shown in FIG. 2*a* or 2*b*) and an open position (as shown in FIG. 3). When closed, the drawer securely contains and hides from view any items stored within its storage space. When open, the drawer presents the storage space and the items contained therein for easy viewing and access by a human user. The storage space in the first (drawer) tier 202*a* is defined and surrounded by a bottom surface 305 (see, e.g, FIG. 3) and the four side surfaces of the drawer.

In this example system, the other tiers 202*b*, 202*c*, 202*d* in the illustrated implementation are arranged in a swing tier configuration. In a typical implementation, a swing tier configuration has three categories of components including 1) a core tier of which there is only one, 2) one or more top tiers, and 3) one or more bottom tiers. The "core" tier generally serves as the tier upon which all other tiers in the swing tier configuration are designed. In the illustrated implementation, the third tier 202*c* serves as a core tier, whereas the second tier 202*b* serves as a bottom tier and the fourth tier 202*d* serves as a top tier. In a typical implementation, modules arranged in a swing tier configuration are coupled together by sets of hinge arms (e.g., 204*a*, 204*b*) that enable those modules to swing about respective hinges relative to one another between a closed configuration and an open configuration.

As depicted, the bottom tier 202*b* of the illustrated swing tier configuration sits atop the first tier 202*a* of the container system 200. In this example system, the bottom swing tier 202*b* remains stationary relative to the first tier 202*a* whether the system 200 is in a closed configuration or an open configuration.

The core tier 202*c* of the swing tier configuration is coupled to the bottom swing tier 202*b* of the swing tier configuration by a first set of hinge arms 204*a* that enables the core tier 202*c* to swing, relative to the bottom swing tier 202*b*, between the closed position and the open position. In the closed position and in this example system, the core tier 202*c* sits atop and covers the bottom swing tier 202*b* so that the storage space of the bottom swing tier 202*b* is closed to viewing or accessing and so that any items stored therein are secured. In the open position (FIG. 3), the core tier 202*c* is out of vertical alignment with the bottom swing tier 202, thereby exposing the storage space in the bottom swing tier 202*b* so that a human user can view and/or access the storage space in the bottom swing tier 202*b* (e.g., to add or remove items from the storage space). The storage space in the bottom swing tier 202*b* is defined and surrounded by a bottom surface 307 (FIG. 3), and the four side surfaces of the bottom swing tier 202*b*.

The top tier 202*d* of the swing tier configuration is coupled to the core tier 202*c* of the swing tier configuration by a second set of hinge arms 204*b* that enables the top tier 202*d* to swing, relative to the core tier 202*c*, between the closed position and the open position. In the closed position and in this example system, the top tier 202*d* sits atop and covers the core tier 202*c* so that the storage space of the core tier 202*c* is closed to viewing or accessing and so that any items stored therein are secured. In the open position, the top tier 202*d* is moved out of vertical alignment with the core tier 202*c*, thereby exposing the storage space in the core tier 202*c* so that a human user can view and/or access the storage space in the core tier 202*c* (e.g., to add or remove items from the storage space). The storage space in the core tier 202*c* is defined and surrounded by a bottom surface 309 (FIG. 3), and the four side surfaces of the core tier 202*c*.

The top tier 202*d*, in the illustrated implementation, has a storage space that is and remains open and accessible to a human user regardless of whether the system 200 is in the closed configuration or open configuration. The storage space in the top tier 202*d* is defined and surrounded by a bottom surface 311 (FIG. 3), and its four side surfaces of the bottom swing tier 202*b*. In FIG. 2*a*, there is no top surface that covers or contains the storage space in the top tier 202*d* of the illustrated implementation. However, and as depicted in FIG. 2*b*, a lid 202*e* can be installed on the top tier 202*d* when not is use and/or for transportation and storage purposes to keep the top tiers contents secure and protect from debris.

As described above, the side surfaces of each module are configured to include hole patterns, namely, a set of holes that can accommodate fasteners (e.g., a Chicago screw/screw post) that fit through those holes. The specific arrangement of holes in the side surfaces of the various modules enable a user to easily configure a collection of modules in any number of a variety of different ways that include stacked and/or side-by-side configurations, with swing trays and/or drawers that open in various directions, and/or various numbers, types, and/or heights of tiers. This enables a user (e.g., a person who purchases a container system as a kit that contains a variety of individual pieces) to assemble and/or subsequently reconfigured a storage container with the pieces of the kit, in any number of different ways—to accommodate different desired uses for the storage container and/or uses that evolve or change over time.

In the illustrated implementation, all of the side surfaces of each swing tier module (e.g., 202*b*, 202*c*, 202*d*) have holes arranged in the same basic pattern. As explained above, that pattern places holes at three different heights on the side surface—a lower height, a middle height, and an upper height.

In this example system, the three side surfaces of the drawer tier module (e.g., 202*a*) have a hole pattern that is similar to the hole pattern described above. Each side surface of the drawer tier module also has a fourth (highest) row of holes. That row of holes has two holes, each one being in vertical alignment with a corresponding one of the lower height holes. The holes in the fourth tier are used to retain the connectors that couple the bottom swing tray to the drawer base.

In various implementations, certain side surfaces may have a different configuration of holes; preferably, however, there is at least some commonality in the hole pattern arrangements across the various components of a system kit to facilitate interchangeability, flexibility, modularity, and adjustability of the overall system 200.

Figure 4:
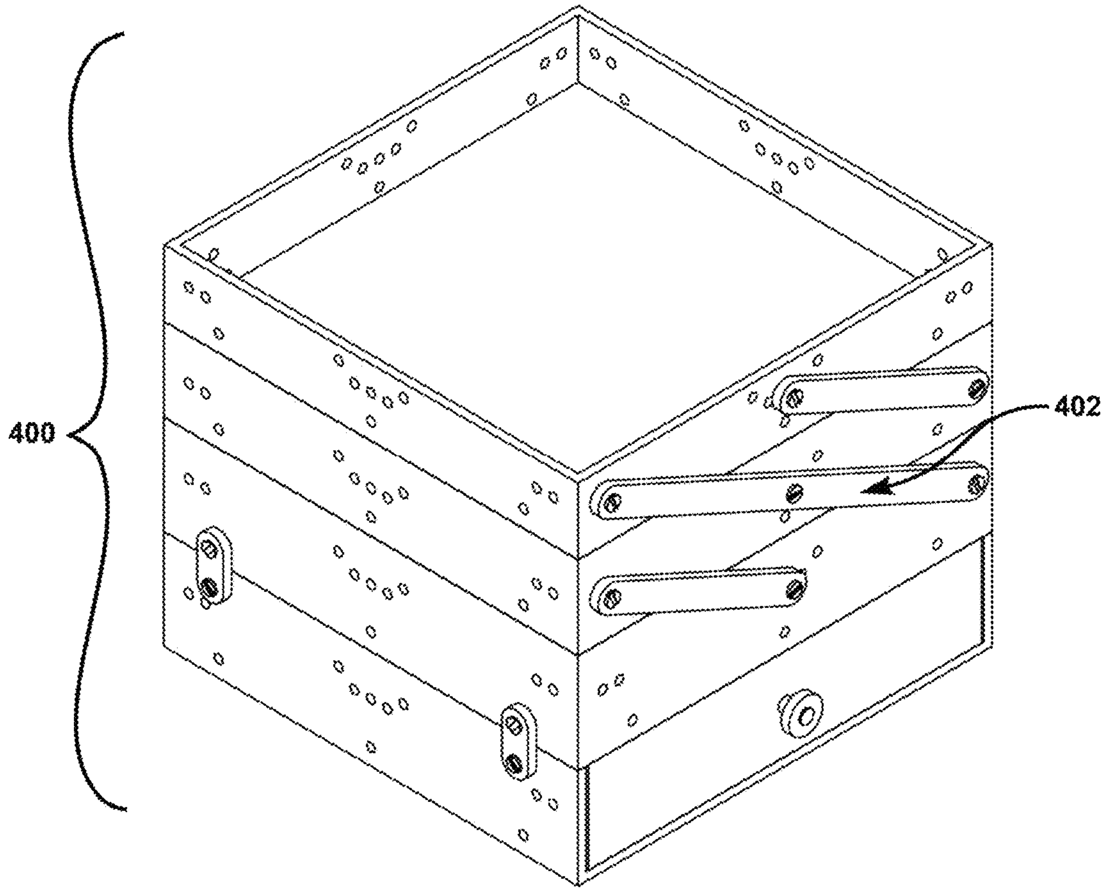
FIG. 4 depicts a second storage system that includes a 3-hole hinge arm hardware arrangement, with the modules in a closed configuration.
Figure 5:
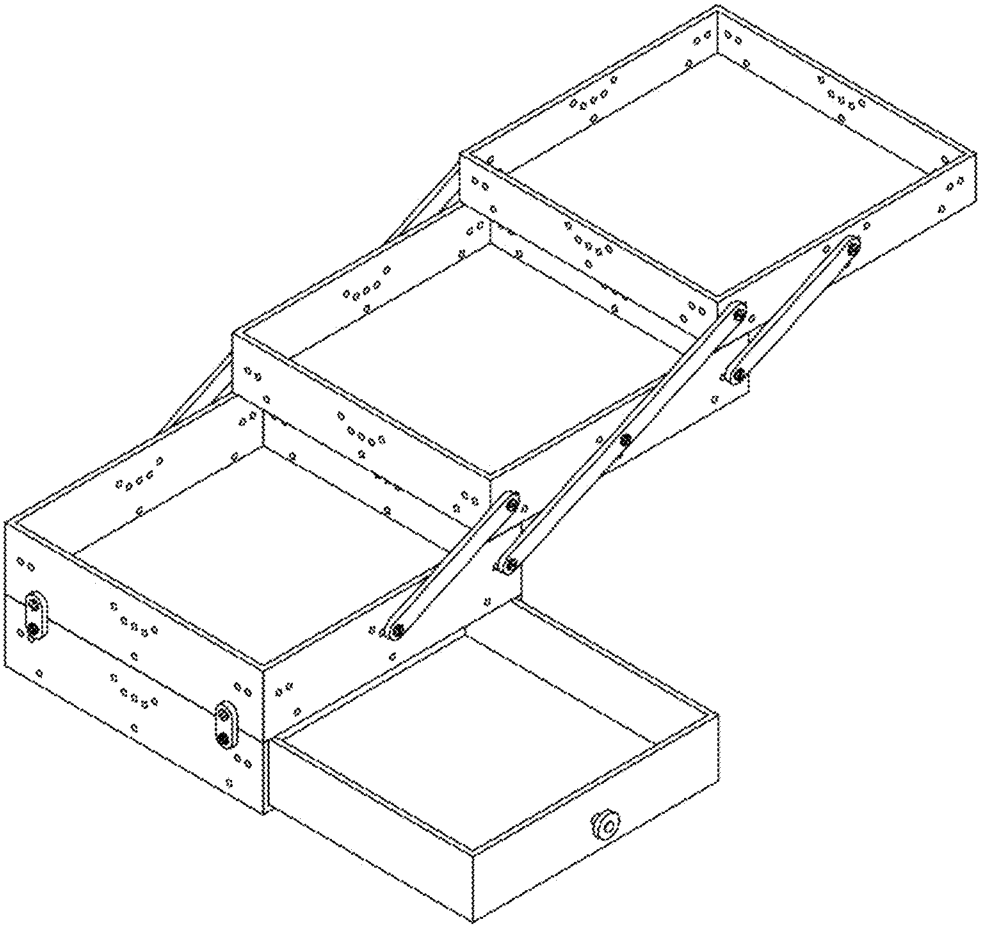
FIG. 5 depicts the second storage system with the modules in an open configuration.

FIG. 4 depicts a second storage system 400 that includes a 3-hole hinge arm hardware arrangement 402 coupling the top and bottom swing tiers, and with the modules in a closed configuration. FIG. 5 depicts the second storage system with the modules in an open configuration.

Figure 6:
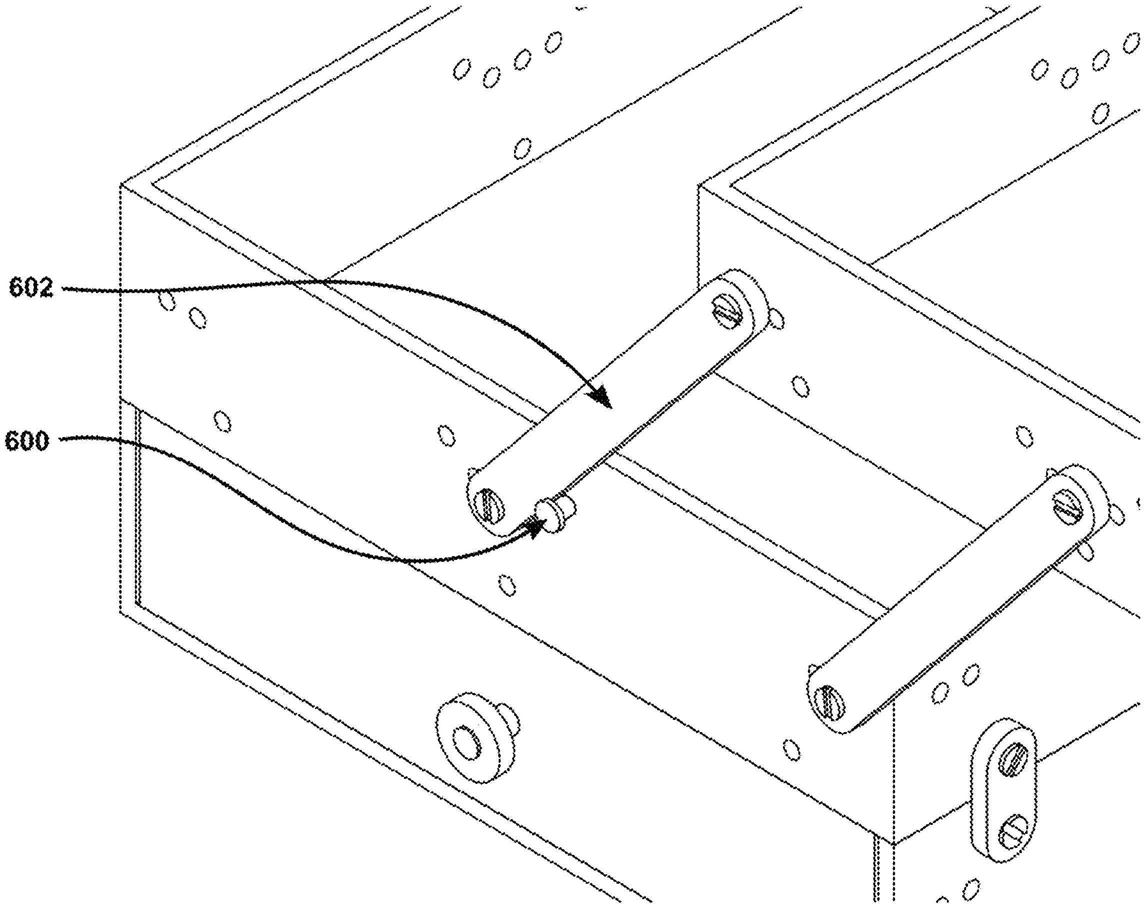
FIG. 6 depicts a portion of a module supporting a hinge arm stop.
Figure 7:
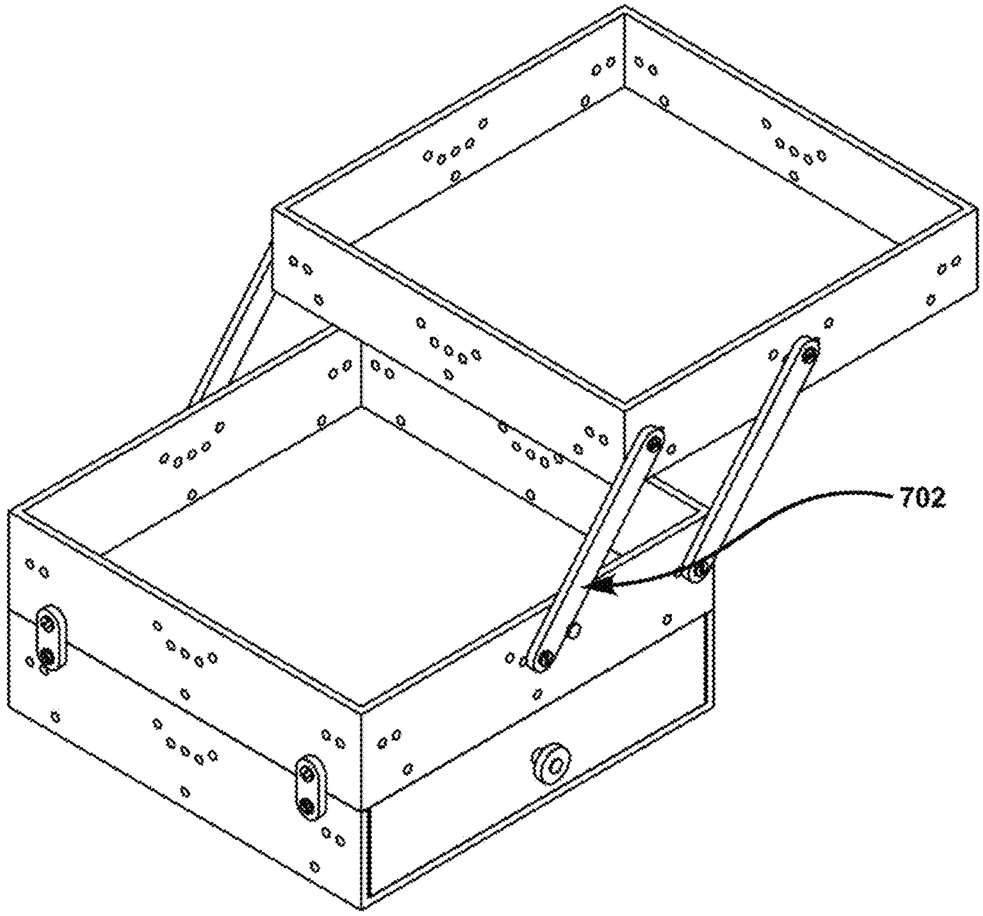
FIG. 7 depicts a container system that includes the hinge arm stop and in an open configuration.

FIG. 6 depicts a module having a hinge arm support 600 configured to support a hinge arm. These supports are optional. FIG. 7 depicts a three-tier system that includes hinge arm supports for at least hinge arm 702.

FIG. 8 depicts modules that include drawer catches 804 and hinge latches 806. Drawer catches are used to secure drawers from opening. The hinge latches secure two adjacent swing tray tiers from opening.

Figure 9:
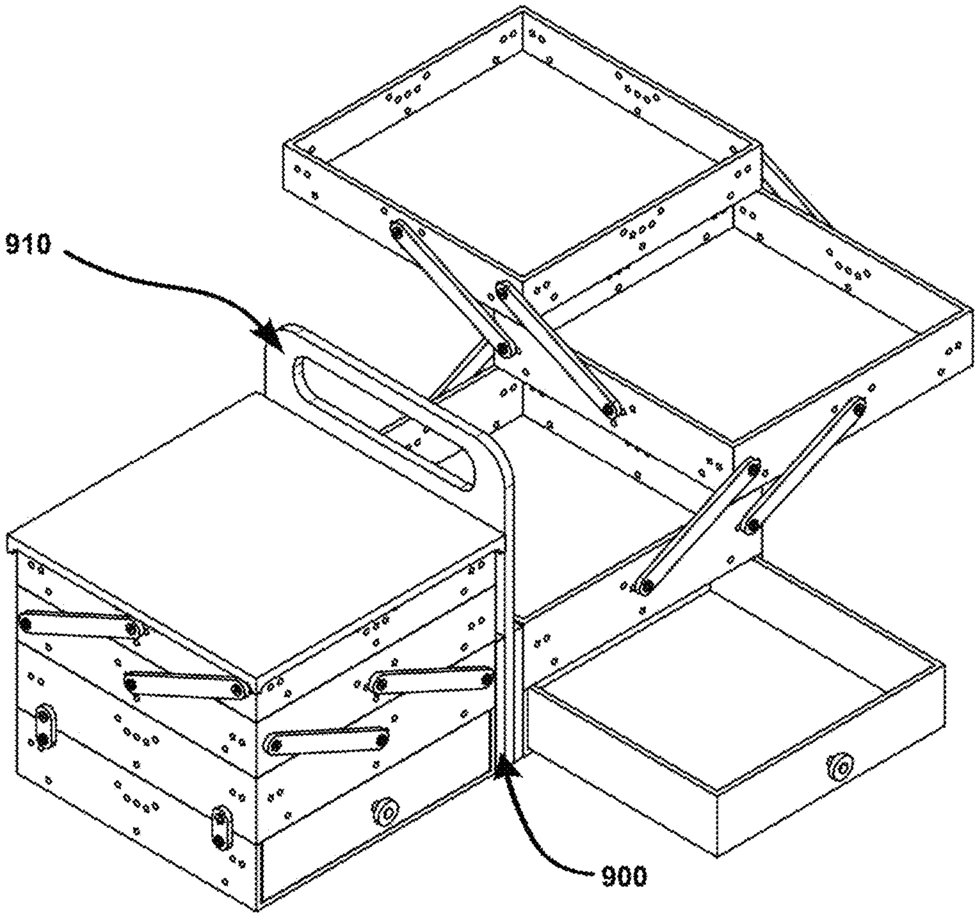
FIG. 9 depicts a third example storage system that incorporates a carrying handle.
Figure 10:
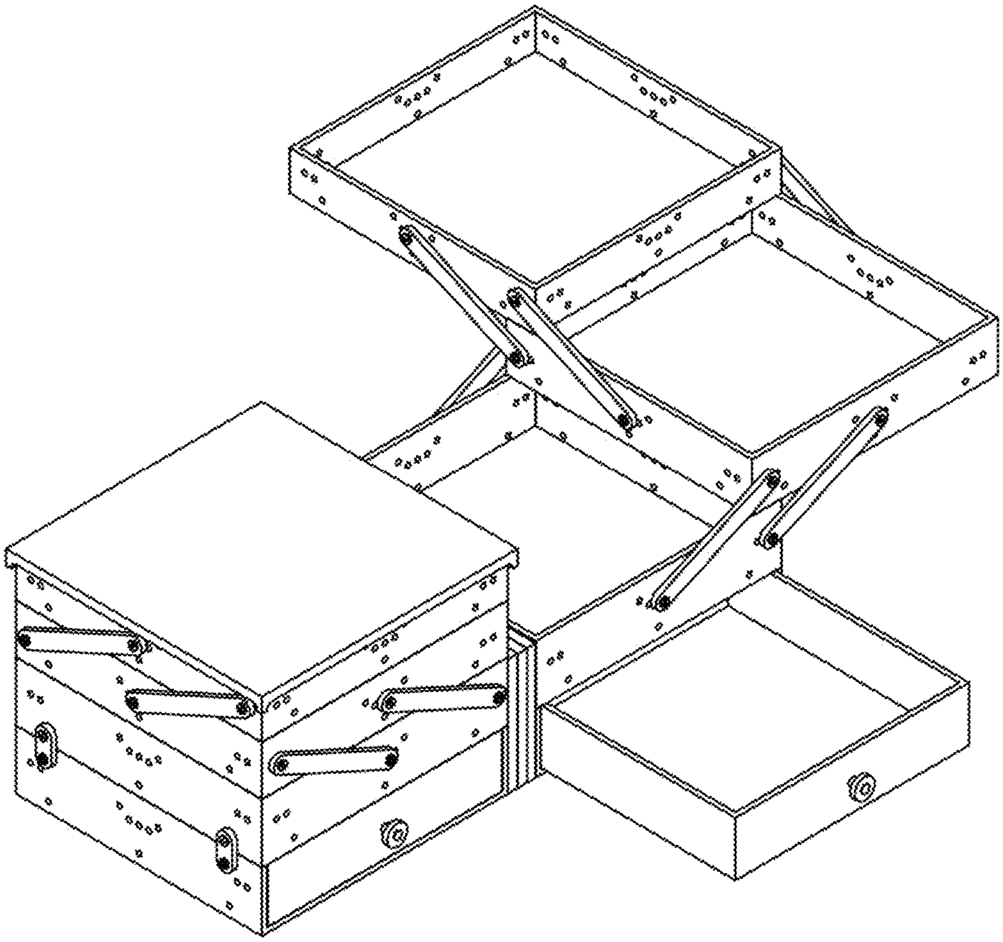
FIG. 10 depicts the third example storage system with the carrying handle in a retracted position.

As depicted in FIGS. 9 and 10, multiple vertical stacks of modular storage container systems can be joined to each other, for example, by using an intermediary modular joining block 900, where the block is positioned between two vertical stacks and uses the side surface and hole series of one module or more from each stack as connection points for removable hardware. The joining block is of sufficient thickness to enable the opening and closing of modules in each stack without interference of the hinge arms of each stack. The joining block also provides connection points for handles, such as handle 910, to facilitate transport. There is no limit to how many systems can be joined together. In FIG. 9, the handle is shown, and FIG. 10 depicts the joining block without the handle. In another variant (not shown), the handle comprises part of the joining block and is extended or retracted as necessary.

Figure 11:
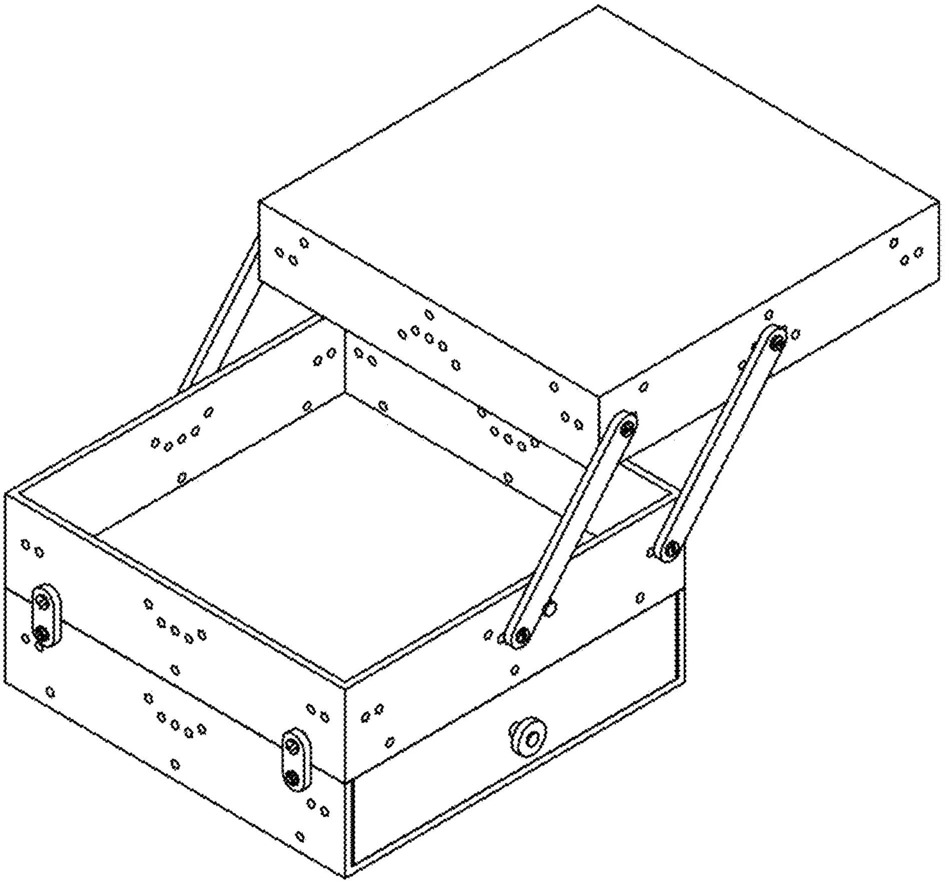
FIG. 11 depicts a fourth example storage system configured in a clamshell configuration.
Figure 12:
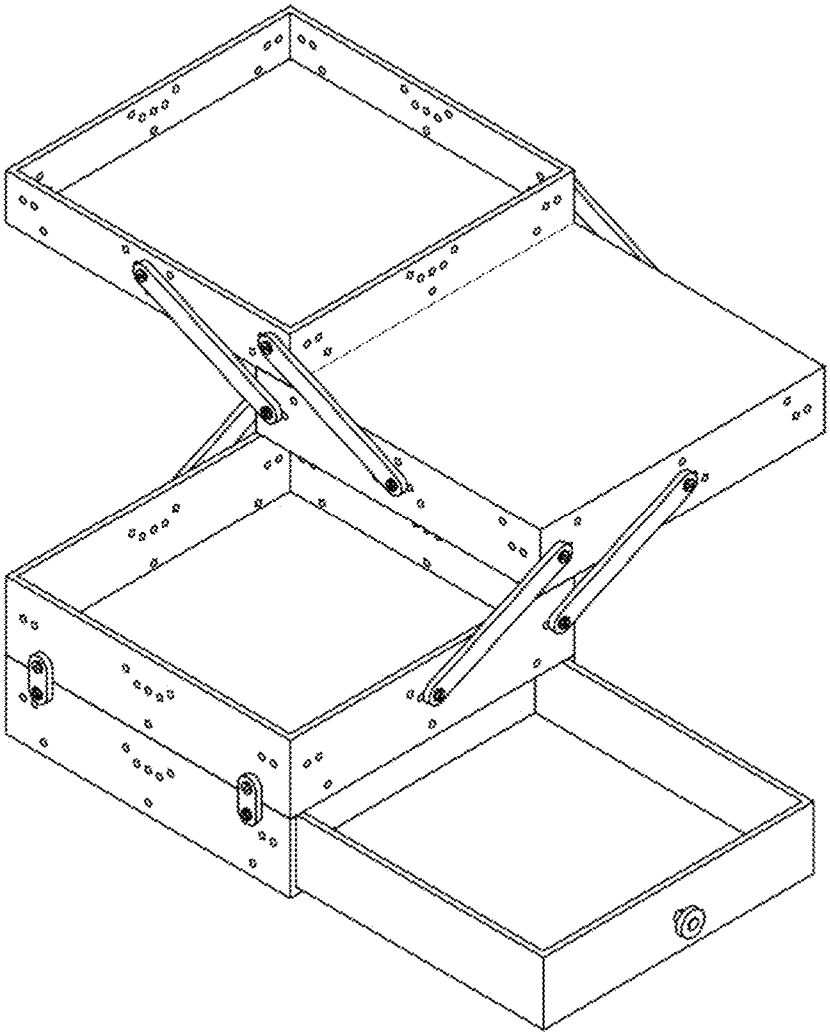
FIG. 12 depicts a fifth example storage system configured in the clamshell configuration.

Bottom and core swing tray modules may alternately be stacked with one of them directly above the other in an inverted orientation with the opening of the upper swing tray module facing down while the opening of the lower swing tray module is facing up to create a larger storage cavity. (see, e.g., FIGS. 11 and 12). Orienting swing tray modules in this manner (namely, with their openings facing each other) is referred to herein as a clamshell configuration. The clamshell configuration may be done with any combination of bottom and core trays with their openings facing each other.

A top swing tray may still be utilized with a clamshell configuration, as long as the top tray is in a typical orientation and if a core tray is located below the top tray. Using a top tray above a core tray in a clamshell configuration creates a flat surface which the user can utilize while the top tray is swung open see, e.g., FIG. 11). A few non-limiting examples of the many clamshell combinations are: (i) bottom tray with bottom tray inverted on top; (ii) bottom tray with core tray inverted on top; (iii) bottom tray with core tray inverted above and top tray on top; (iv) core tray with core tray inverted on top; (v) core tray with core tray inverted above and top tray on top; (vi) and core trave with bottom tray inverted on top.

Figure 13:
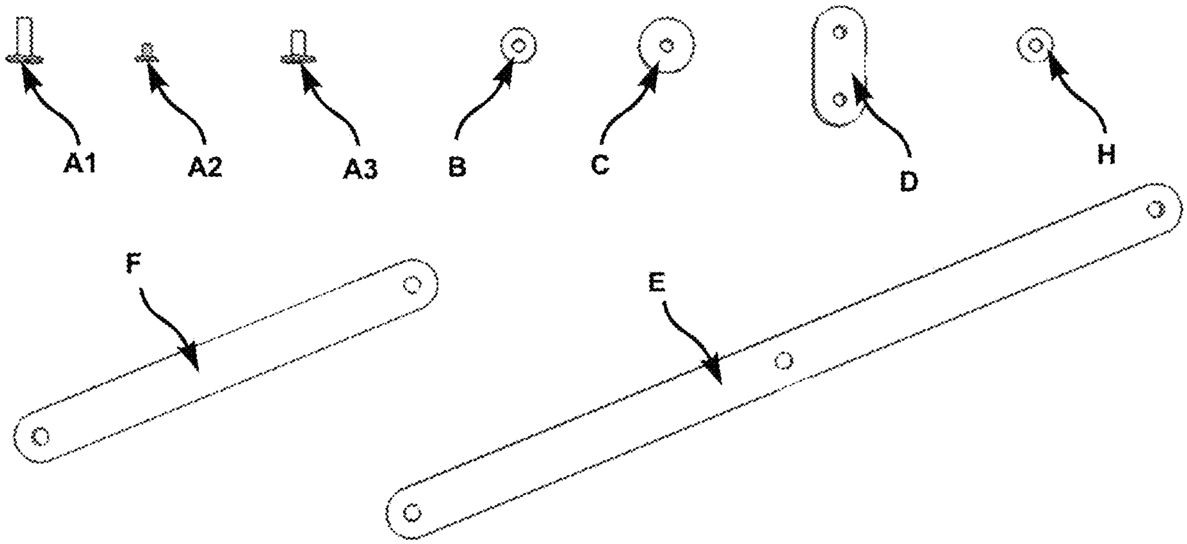
FIG. 13 depicts a representative set of hardware elements for use in configuring a modular storage system.

FIG. 13 depicts representative hardware elements. These include M5×15 mm Chicago screw posts A1, M4×5 mm Chicago screws A2, M5×10 mm Chicago screw posts A3, a knob spacer B, a knob C, a base connector D, a 3-hole hinge arm E, a 2-hole hinge arm F, and a bearing spacer H. These hardware elements are not intended to be limiting. Others include, without limitation, screws, nuts and bolts, ball lock pins, pins with e-clips, and pin rivets.

Once configured as a storage system, the modules provide for the above-described open and closed configurability. As noted, however, the configurations obtained by a particular storage system are not intended to be fixed/permanent. As noted, the modules of a given system are readily reassembled in different configurations as needs and/or desires change.

A number of embodiments of the disclosed have been described. Nevertheless, it will be understood that various modifications may be made without departing from the spirit and scope of the subject matter.

For example, the absolute and/or relative size, shape and/or storage capacity of each system component can vary. Additionally, as described herein, the system may be sold as a kit of components that the purchaser can assemble in any one of a variety of different ways depending on the purchaser's intended use for the storage container. In some implementations, the system may be sold pre-assembled in some configuration (e.g., as shown in FIGS. 2*a* and 3). In some of those instances, it may be possible for the purchaser to easily disassemble and reconfigure the pre-assembled system with or without additional parts/components. In various implementations, the system, when sold, may include any one of a variety of different combinations of component that make up or that can be used to assemble a storage system.

In some implementations, the arrangement of holes in certain of the side surfaces can vary. For example, in some implementations, a particular side surface (or multiple side surfaces) may have fewer or more holes in it than shown or described herein. Moreover, in some implementations, one or more of the side surfaces may have no holes in it, while the other side surfaces have holes in them.

The size and type of fasteners can vary and the method of fastening or securing various components to one another can vary. Representative fasteners include, for example, screws, nuts and bolts, ball lock pins, pins with e-clips, spiral cam lock fasters, and pin rivets. The materials used for various components of the storage system can vary. As noted above, the modular storage system is scalable to any size and may be made from any material strong enough to support its own weight and the weight of its contents. Materials woods, plastics, synthetic or composite materials, synthetic polymeric materials, glass, polycarbonates, acrylics, resins, metals, carbon based materials, or combinations of these materials.

A representative but non-limiting use case for the modular storage system is a gamer's storage bundle with four (4) storage modules, namely, one (1) drawer module, and three (3) swing tray modules. The gamer's storage bundle provides a place to keep the user's board games, playing cards, game pieces, miniatures, dice, instruction and more. The storage system allows the user to easily organize all the pieces, e.g., in an easy to carry 12.5"×12.5"×14" container, and to reconfigure the direction that the swing tiers and drawers open for easy access during game play. This system may be assembled as follows using the parts depicted and described above.

One or more components of the modular storage system may be manufactured using 3D file generation and printing, or by laser cutting, as is now described. To this end, in a first embodiment, a 3-dimensional model of the component is created in a Computer-Aided Design (CAD) software program (such as Sketch-Up, Fusion360, or the like). The file is then exported as a .stl (stereolithography) file, which is basically a 3D exterior mesh of the widget. The .stl file is then imported into a slicer software (e.g., Cura, Slicer, SuperSlicer, or the like), which software is a Computer-Aided Manufacturing (CAM) program that slices the 3D model into layers based upon the settings and generates the appropriate G-Code to control a 3D printer and print the component out of a variety of materials. An alternative manufacturing approach is to use laser cutting file generation. To this end, a 2-dimensional design of the component is created in a program, which can be any program capable of exporting the design as a .pdf, .dxf, .ai, svg or any other vector file. This design is then imported into a CAM program, such as LightBurn, RD Works or other laser CAM software, where the design is then used to generate the G-Code to control the laser cutter to use light energy to cut the design from the material.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations, one or more features from a described combination can in some cases be excised from the combination, and the described combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking, for example, may be advantageous. Moreover, the separation of various system components in the embodiments described above should not be understood as requiring such separation in all embodiments.

Other implementations are within the scope of the claims.

The invention claimed is:

1. A container system, comprising:

at least first and second modules, wherein each of the first and second modules comprises a plurality of side structural members each of which has a height and a length;

wherein each of the side structural members of the first module includes a series of mounting holes positioned horizontally on an axis extending along the length;

wherein each of the side structural members of the second module includes the series of mounting holes positioned horizontally on an axis extending along the length;

the series of mounting holes including at least a first mounting hole at approximately a center of the side structural member, a second mounting hole placed near a first end of the side structural member, and a third mounting hole placed near a second end of the side structural member opposite the first end;

a set of hinge arms mountable at adjustable locations via the series of mounting holes in the first and second modules; and removable hardware configured together with the set of hinge arms to reconfigurably couple the second module to the first module, the second module being movable relative to a first side structural member of the first module via the set of hinge arms from a closed position overlaying the first module to an open position directionally offset from the first side structural member in one of: first, second, third and fourth directions, wherein an open position directional offset corresponding to one of the second, third and fourth directions is, respectively, 90, 180 and 270 degrees offset from the first direction.

2. The container system as described in claim 1, wherein the removable hardware comprises one of: screws, nuts and bolts, ball lock pins, pins with e-clips, spiral cam lock fasteners, and pin rivets.

3. The container system as described in claim 1, wherein the removable hardware includes a stop to support at least one of the hinge arms.

4. The container system as described in claim 1, wherein the removable hardware includes a catch to secure either the first or second module against a lateral movement.

5. The container system as described in claim 1, wherein the removable hardware includes a latch to prevent the first and second modules from movement relative to one another.

6. The container system as described in claim 1, further including a carrying handle.

7. The container system as described in claim 1, wherein each of the first and second modules have a bottom.

8. The container system as described in claim 7, wherein the bottom of the first module and the bottom of the second module are positioned in an opposed relationship to form a clamshell configuration.

9. The container system as described in claim 1:

wherein the axis of the first module is located a given distance from a first edge along the length of the structural member of the first module; and wherein the axis of the second module is located the given distance from a first edge along the length of the structural member of the second module.

10. The container system as described in claim 9, wherein the given distance is one-half the height of the structural member of each of the first and second modules when the first and second modules have a same height.

11. The container system as described in claim 1, wherein the open position directional offset corresponding to a given one of the first, second, third and fourth directions is associated with at least one hinge arm mounted in the first mounting hole and the second mounting hole across side structural members of the first and second modules, and wherein the open position directional offset corresponding to a direction opposite the given one of the first, second, third and fourth directions is associated with the at least one hinge arm repositioned and mounted in the first mounting hole and the third mounting hole across the side structural members of the first and second modules.

12. A container system, comprising:

at least first and second modules, wherein each of the first and second modules comprises a plurality of side structural members each of which has a height and a length;

wherein at least one side structural member of the first module includes a series of holes positioned horizontally along an axis extending along the length, the axis located a given distance from a first edge along the length of the structural member of the first module, the series of holes comprising part of a hinge arm mounting hole pattern, wherein the hinge arm mounting hole pattern consists essentially of: three holes at a first offset from the axis, seven holes along the axis, and two holes at a second offset from the axis;

wherein at least one side structural member of the second module also includes the series of holes positioned horizontally along its axis extending along the length, the axis of the structural member of the second module also located the given distance from a first edge along the length of the structural member;

one or more hinge arms; and removable hardware configured to couple the second module to the first module via the one or more hinge arms at locations that are adjustable according to the hinge arm mounting hole pattern, the second module being movable relative to the first module from a first position overlaying the first module to a second position offset from the first module.

13. The container system as described in claim 12, wherein the three holes at the first offset from the axis consist of a first hole at a center of the side surface, a second hole placed near a first end of the side surface, and a third hole placed near a second end of the side surface opposite the first end.

14. The container system as described in claim 12, wherein the seven holes along the axis consist of a first hole at a center of the side surface, second and third holes near and on opposite sides of the first hole, a fourth hole placed near a first end of the side surface, and a fifth hole placed near a second end of the side surface opposite the first end.

15. The container system as described in claim 12, wherein the two holes at the second offset from the axis are holes centered around and equidistant from a center of the side surface.

* * * * *